Jan. 14, 1930.  E. C. ANDERSON  1,743,908
LOCOMOTIVE CYLINDER HEAD
Filed May 2, 1929  2 Sheets-Sheet 2
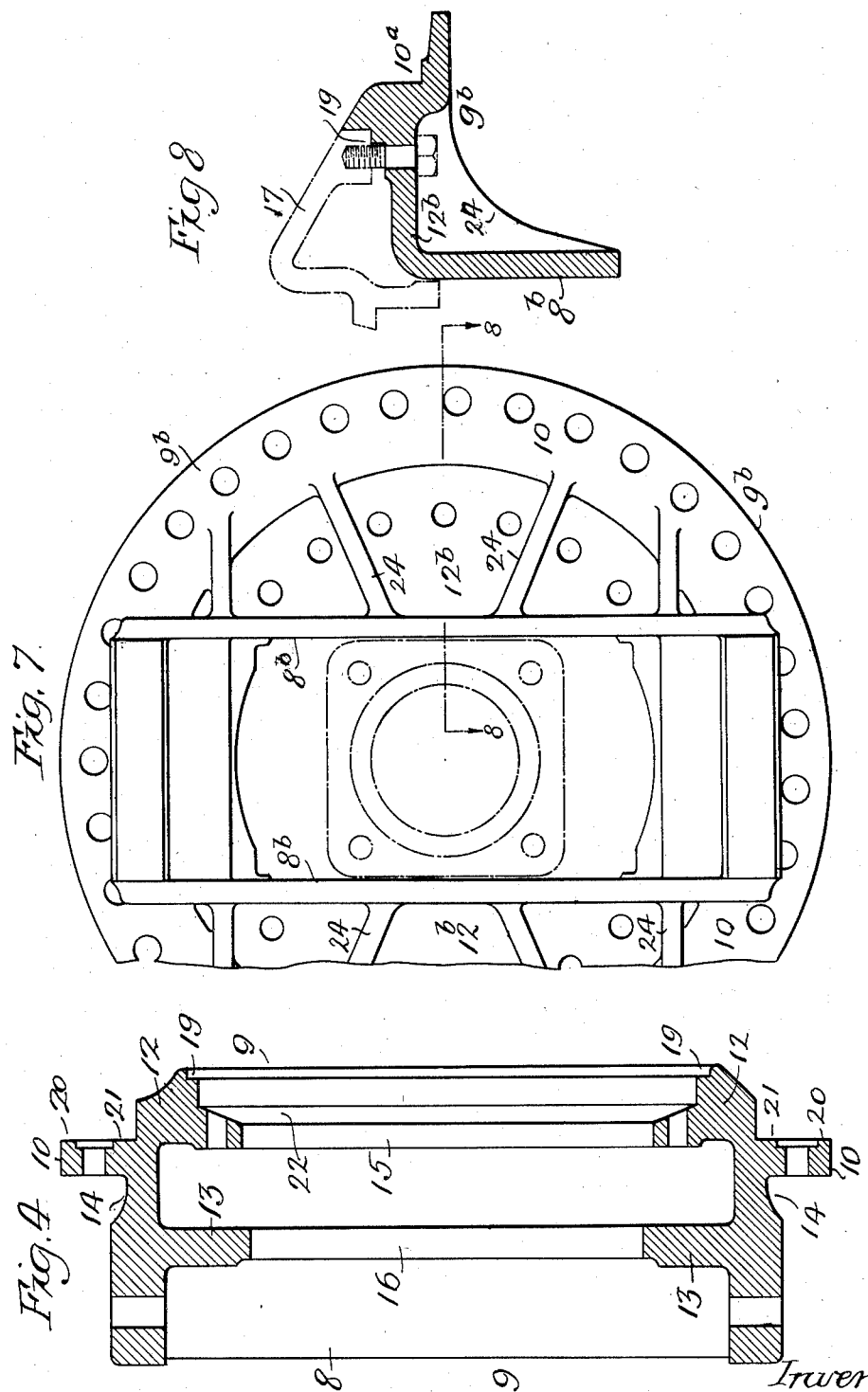

Jan. 14, 1930.  E. C. ANDERSON  1,743,908
LOCOMOTIVE CYLINDER HEAD
Filed May 2, 1929   2 Sheets-Sheet 1
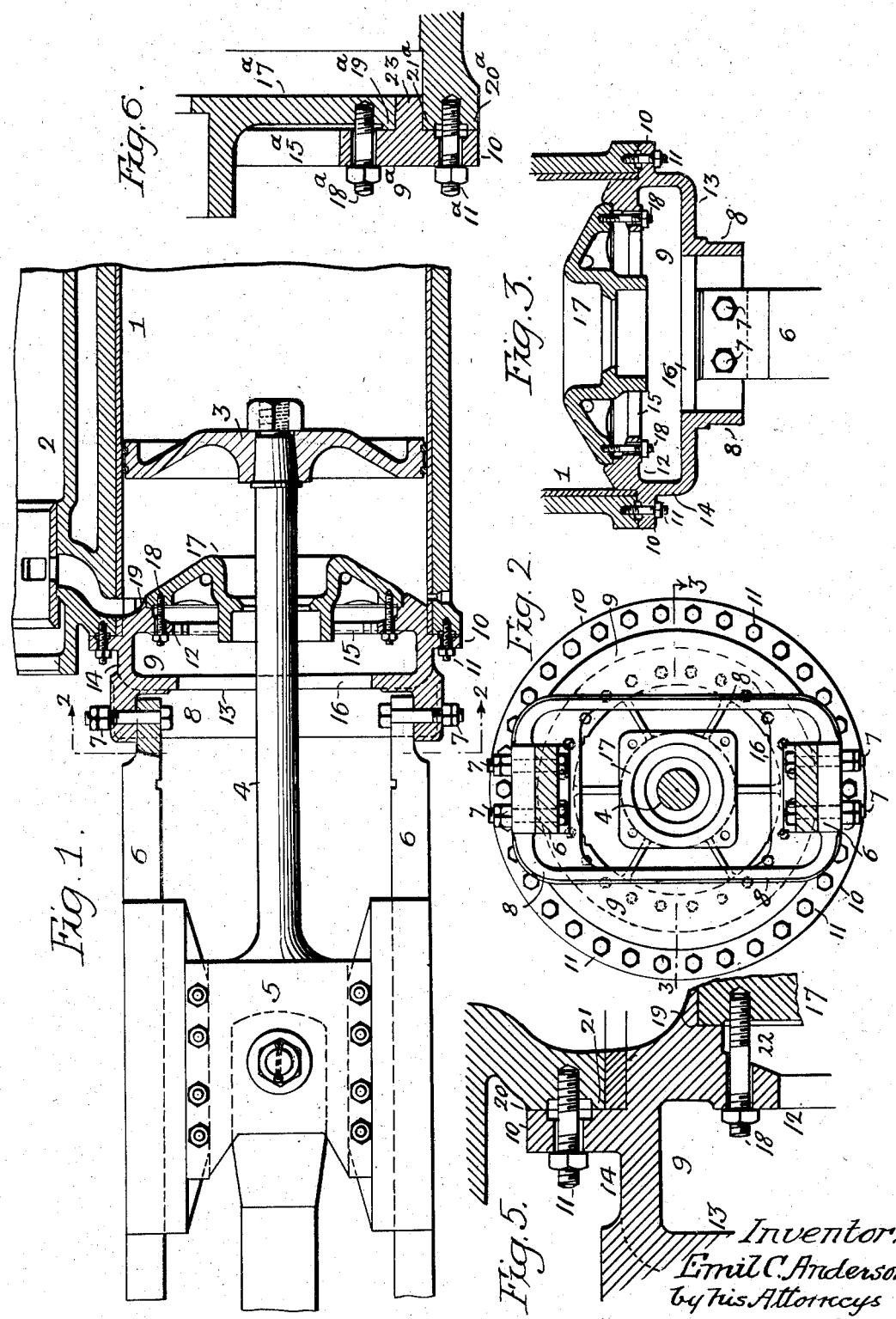
Inventor:-
Emil C. Anderson
by his Attorneys Patented Jan. 14, 1930

1,743,908

UNITED STATES PATENT OFFICE

EMIL C. ANDERSON, OF DOWNERS GROVE, ILLINOIS

LOCOMOTIVE CYLINDER HEAD

Application filed May 2, 1929. Serial No. 359,951.

My invention relates to certain improvements in the heads of locomotive cylinders, particularly adapted to be used in connection with a piston rod having an integral cross-head.

The present application is a companion to that filed by me on the 13th day of March, 1929, under Serial No. 346,632.

One object of the present invention is to improve the construction of the cylinder head by making the head in two parts, an outer part which is attached directly to the cylinder structure, and an inner part secured to said outer part, the opening in the outer part being sufficient for the free passage of the integral cross-head of the piston.

Another object of the invention is to so construct the outer cylinder head that it will resist the distortions due to the thrust of the vertical component of the piston thrust on the guides.

And a further object of the present invention is to make the head rigid in construction so as to prevent leaks at the joint.

In the accompanying drawings:

Fig. 1 is a side view, partly in section, of a locomotive cylinder, piston rod and cross-head to illustrate my invention;

Fig. 2 is a sectional view on the line 2—2, Fig. 1;

Fig. 3 is a sectional plan view on the line 3—3, Fig. 2;

Fig. 4 is an enlarged sectional view of the head shown in Fig. 1;

Fig. 5 is an enlarged sectional view of part of Fig. 1;

Fig. 6 is a view illustrating a modification of the invention; and

Figs. 7 and 8 are views illustrating a further modification of the invention, Fig. 8 being a section on the line 8—8, Fig. 7.

Referring to the drawings, 1 is the cylinder of a locomotive in the present instance. 2 is a valve chest. 3 is a piston which is driven onto the piston rod 4. This rod is made integral with the cross-head 5 which is adapted to slide on the guides 6 which, in the present instance, are secured by bolts 7 to pads on the yoke 8 on the outer section 9 of the head of the cylinder which has an annular flange 10 secured by stud bolts 11 to the end of the cylinder structure 1.

The outer section 9 of the cylinder head is an integral structure and consists of an inner ring 12 and an outer ring 13 connected by an annular web 14, making a dome-like head which will resist the inside pressures and the outside strains. In the inner ring 12 is an annular opening 15 which is of sufficient size to allow for the free passage of the cross-head 5, and in the outer ring 13 is a rectangular opening 16 in the present instance of sufficient size to allow for the free passage of the cross-head 5. The opening is surrounded by the yoke 8, which materially strengthens the head.

17 is the inner section of the cylinder head which is secured to the outer section by stud bolts 18 which are screwed into the inner section 17 and pass through openings in the inner ring 12 of the outer section 9 of the head. The joint 19 between the two sections of the head is preferably a ground joint. The inner section 17 of the head is an integral structure and is placed on the piston rod prior to securing the piston on the rod.

The piston rod having the integral cross-head and the piston which is driven onto the end of the piston rod are assembled with the inner section 17, the cross-head 5 being passed through both the openings 15 and 16 in the outer cylinder head, after which the inner section 17 of the head is secured in position. The inner section 17 of the head is shaped to receive a stuffing box, which is not shown.

In Fig. 5 I have illustrated the joint between the outer section of the cylinder head and the cylinder structure, and the joint between the inner cylinder head and the outer cylinder head. By making the joint between the flange of the outer cylinder head and the cylinder structure as shown in Fig. 5, two annular bearings 20 and 21 are provided, one bearing being on the outside of the row of studs and the other on the inner side of the row of studs, making a very substantial and tight joint between the two parts. This joint is preferably a steam tight ground joint. The joint acts as a brace against distortion from the thrust on the guides, from the pressure within the cylinder, and from the unequal tightening up of the studs 18.

It will be noticed that the inner ring of the outer section of the head is cut back as at 22, so as to enable the inspector to locate any possible leaks that may occur in the joint between the inner and outer sections of the head.

While I have shown the yoke rectangular in shape, in some instances it may be circular in form, conforming to the shape of the cylinder head, and the opening 16 is shown rectangular in Fig. 2, but it may be circular, without departing from the scope of the invention. But in the type of locomotive in which there are two guides 6 which are secured to the upper and lower portions of the cylinder head, I prefer to make the yoke rectangular, to resist distortions due to the thrust on the guides.

In Fig. 6 I have shown the invention as applied to a two-section cylinder head, in which the outer section 9ª is in the form of a ring with a reinforcing member 23 on the inside and a flange 10ª through which the stud bolts 11ª extend. The inner section 17ª is secured to the outer section by stud bolts 18ª. The opening 15ª in the outer section of the cylinder head is of sufficient diameter to allow the piston rod with its integral cross-head to be inserted through the head. In this instance there are annular bearings 20ª and 21ª on either side of the series of bolts 11ª, and there is an annular bearing 19 outside of the row of studs 18ª that secure the inner section of the head to the outer section.

In Figs. 7 and 8 I have illustrated a modification of the invention, in which the outer ring 13 of the outer section of the head is dispensed with, the yoke 8ᵇ projecting directly from the rear ring 12ᵇ of the head 9ᵇ, and reinforced by webs 24.

I claim:—

1. The combination of a cylinder open at one end; a two-section head mounted on the cylinder, each section being an integral structure, the outer section having an opening of sufficient size to allow for the passage of the integral cross-head of a piston rod, the outer section consisting of an inner ring and an outer ring, the outer ring reinforcing the said structure; and means for securing the inner section of the head to the inner ring of the outer section.

2. The combination of a cylinder; a two-section head therefor, both sections being integral, the outer section having an opening of sufficient size to allow for the passage of an integral cross-head of a piston rod, and the inner section being shaped to receive a stuffing box through which the piston rod extends, said outer section of the head being reinforced by an outer ring section.

3. The combination of a cylinder; a two-section head therefor, both sections being integral, the outer section having an opening of sufficient size to allow for the passage of an integral cross-head of a piston rod, and the inner section being shaped to receive a stuffing box through which the piston rod extends, said outer section of the head being reinforced by an outer ring section; and a yoke projecting from the outer ring section and surrounding the opening in said outer ring section.

4. The combination of a cylinder; a two-section head therefor, both sections being integral, the outer section having an opening of sufficient size to allow for the passage of an integral cross-head of a piston rod, and the inner section being shaped to receive a stuffing box through which the piston rod extends, said outer section of the head being reinforced by an outer ring section; a yoke projecting from the outer ring section and surrounding the opening in said outer ring section, said yoke having pads; and cross-head guides secured to the pads.

5. The combination of a cylinder; a two-section head therefor, both sections being annular integral structures, the outer section having an enlarged opening therein for the passage of the integral cross-head of a piston rod, the inner section arranged to close said opening, the outer section having an annular flange; a series of stud bolts projecting from the end of the cylinder structure and through openings in the flange of the said head; an annular bearing surface on the outer side of the studs; and an annular bearing on the inner side of the studs.

6. The combination of a cylinder; a two-section head therefor, both sections being annular integral structures, the outer section having an enlarged opening therein for the passage of the integral cross-head of a piston rod, the inner section arranged to close said opening; a series of stud bolts projecting from the end of the cylinder structure and through openings in the outer head; an annular bearing surface on the outer side of the studs; and an annular bearing on the inner side of the studs.

7. The combination of a cylinder; a two-section head therefor, both sections being integral, the outer section having an opening of sufficient size to allow for the passage of an integral cross-head of a piston rod, and the inner section being shaped to receive a stuffing box through which the piston rod extends, said outer section of the head having a yoke projecting from it.

8. The combination of a cylinder; a head therefor having an enlarged opening for the passage of an integral cross-head and piston rod, said head having an external yoke projecting therefrom.

9. A cylinder head for a locomotive in which a piston rod with an integral crosshead is used, said head having an enlarged opening for the passage of the cross-head of the rod when the parts are assembled and having external reinforcing means, said head having a portion to which an inner head can be attached.

EMIL C. ANDERSON.